United States Patent
Zimmanck

(10) Patent No.: US 11,289,910 B2
(45) Date of Patent: *Mar. 29, 2022

(54) METHOD AND APPARATUS FOR IMPEDANCE MATCHING IN VIRTUAL IMPEDANCE DROOP CONTROLLED POWER CONDITIONING UNITS

(71) Applicant: Enphase Energy, Inc., Petaluma, CA (US)

(72) Inventor: Donald Richard Zimmanck, Sebastopol, CA (US)

(73) Assignee: Enphase Energy, Inc., Petaluma, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/920,872

(22) Filed: Jul. 6, 2020

(65) Prior Publication Data

US 2020/0335972 A1    Oct. 22, 2020

Related U.S. Application Data

(63) Continuation of application No. 15/262,089, filed on Sep. 12, 2016, now Pat. No. 10,707,681.

(Continued)

(51) Int. Cl.
*H02J 3/18* (2006.01)
*H02J 3/16* (2006.01)
*H02J 3/38* (2006.01)

(52) U.S. Cl.
CPC .............. *H02J 3/18* (2013.01); *H02J 3/16* (2013.01); *H02J 3/38* (2013.01); *H02J 3/383* (2013.01); *Y02E 10/56* (2013.01); *Y02E 40/30* (2013.01)

(58) Field of Classification Search
CPC ........ H02J 3/18; H02J 3/16; H02J 3/38; H02J 3/383; H02J 2300/24; H02J 3/381; Y02E 10/56; Y02E 40/30

See application file for complete search history.

(56) References Cited

U.S. PATENT DOCUMENTS

2004/0201283 A1    10/2004 Pai et al.
2007/0274114 A1    11/2007 Neacsu
(Continued)

FOREIGN PATENT DOCUMENTS

WO    WO-2014060065 A2    4/2014

OTHER PUBLICATIONS

Brabandere, "Voltage and Frequency Droop Control in Low Voltage Grids by Distributed Generators with Inverter Front-End", Katholieke Universiteit Leuven, Belgium, Oct. 20, 2006.

(Continued)

*Primary Examiner* — Toan T Vu
*Assistant Examiner* — Thai H Tran
(74) *Attorney, Agent, or Firm* — Moser Taboada

(57) ABSTRACT

A method and apparatus for setting an impedance of a power conditioning unit (PCU). In one embodiment, the method comprises applying a disturbance to a virtual AC voltage produced by a power conditioning unit (PCU) that is coupled to a power grid, where the disturbance has a first phase; measuring a second phase of the applied disturbance on the power grid; comparing the second phase of the applied disturbance to the first phase of the disturbance; and adjusting, when the second phase differs from the first phase by more than a threshold amount, an impedance of the PCU.

20 Claims, 3 Drawing Sheets

Related U.S. Application Data

(60) Provisional application No. 62/217,405, filed on Sep. 11, 2015.

(56) References Cited

U.S. PATENT DOCUMENTS

| | | |
|---|---|---|
| 2008/0205096 A1 | 8/2008 | Lai et al. |
| 2012/0306515 A1 | 12/2012 | Barnes et al. |
| 2013/0250635 A1* | 9/2013 | Sivakumar .............. H02M 7/44 363/71 |
| 2014/0032147 A1 | 1/2014 | Verhulst et al. |
| 2014/0049233 A1 | 2/2014 | Cortes et al. |
| 2014/0306533 A1 | 10/2014 | Paquin et al. |
| 2014/0316604 A1 | 10/2014 | Ortjohann et al. |
| 2016/0248253 A1 | 8/2016 | Zimmanck |

OTHER PUBLICATIONS

Pogaku et al., "Modeling, Analysis and testing of Autonomous Operation of an Inverter-Based Microgrid", IEEE Transactions on Power Electronics, vol. 22, Issue 2, Mar. 2007.

Brabandere et al., "Control of Microgrids", IEEE Power Engineering Society General Meeting, Jun. 24-28, 2007.

De Brabandere et al., "A Voltage and Frequency Droop Control Method for Parallel Inverters", IEEE Transactions On Power Electronics, Institute of Electrical and Electronics Engineers, USA, vol. 22, No. 4, Jul. 1, 2007.

Sao et al., "Control and Power Management of Converter Fed Microgrids", IEEE Transactions on Power Systems, vol. 23, Issue 3, Aug. 2008.

Vasquez J C et al., "Adaptive Droop Control Applied to Voltage-Source Inverters Operating in Grid-Connected and Islanded Modes", IEEE Transactions On Industrial Electronics, IEEE Service Center, Piscataway, NJ, USA, vol. 56, No. 10, Oct. 1, 2009.

Iyer et al., "A Generalized Computational Method to Determine Stability of a Multi-inverter Microgrid", IEEE Transactions on Power Electronics, vol. 25, Issue 9, Sep. 2010.

Yao et al., "Design and Analysis ofthe Droop Control Method for Parallel Inverters Considering the Impact of the Complex Impedance on the Power Sharing", IEEE Transactions on Industrial Electronics, vol. 58, Issue 2, Feb. 2011.

Kim et al., "Mode Adaptive Droop Control With Virtual Output Impedances for an Inverter-Based Flexible AC Microgrid", IEEE Transactions on Power Electronics, vol. 26, Issue 3, Mar. 2011.

Rocabert et al., "Control of Power Converters in AC Microgrids", IEEE Transactions on Power Electronics, vol. 27, Issue 11, Nov. 2012.

Majumder et al., "Droop Control of Converter-Interfaced Microsources in Rural Distributed Generation", IEEE Transactions on Power Delivery, vol. 25, Issue 4, Oct. 2010.

Jeronimo Quesada et al., "Decoupled droop control of inverters", IECON 2013—39$^{th}$ Annual Conference of the IEEE Industrial Electronics Society, IEEE, Nov. 10, 2013.

Yajuan Guan et al., "A simple autonomous current-sharing control strategy for fast dynamic response of parallel inverters in islanded microgrids", 2014 IEEE International Energy Conference (Energycon), IEEE, May 13, 2014.

Extended European Search Report dated Feb. 14, 2019 for Application No. 16845250.6, 10 pgs.

* cited by examiner

continued …

METHOD AND APPARATUS FOR IMPEDANCE MATCHING IN VIRTUAL IMPEDANCE DROOP CONTROLLED POWER CONDITIONING UNITS

CROSS-REFERENCE TO RELATED APPLICATIONS

This application is a continuation of co-pending U.S. patent application Ser. No. 15/262,089 filed Sep. 12, 2016, which claims priority to U.S. Provisional Patent Application No. 62/217,405, entitled "Method for Impedance Matching in Virtual Impedance Droop Controlled Inverters" and filed Sep. 11, 2015. Each of the aforementioned patent applications is herein incorporated in its entirety by reference.

BACKGROUND OF THE INVENTION

Field of the Invention

Embodiments of the present invention generally relate to power conversion and, more particularly, to impedance matching in virtual impedance droop controlled power conditioning units (PCUs).

Description of the Related Art

Droop control is an industry standard technique for autonomously sharing load among parallel AC generators/inverters proportional to their power ratings or operating costs. The technique relies on using small changes in voltage and frequency to dictate changes in real and reactive power levels. Optimal performance of droop control relative the Point of Common Coupling (PCC) is achieved when the relationship between voltage and frequency and real and reactive power is dictated by the following droop equations:

$$f - f_0 = k_p \frac{X}{Z}(P - P_0) + k_p \frac{R}{Z}(Q - Q_0)$$

$$U - U_0 = -k_q \frac{R}{Z}(P - P_0) + k_q \frac{X}{Z}(Q - Q_0)$$

where f is frequency, U is fundamental voltage, kp and kq are the droop gains, P is real power, Q is reactance, X is the reactive impedance to the PCC, R is the real impedance to the PCC, and Z is the total impedance amplitude $Z^2 = X^2 + R^2$. This requires knowledge of the X/R ratio of the impedance to the PCC.

The "virtual impedance droop control" technique is a time-domain implementation of droop control by which the converter is controlled to appear (from the perspective of the power grid) as a virtual AC voltage source in series with a virtual impedance having an inductive impedance (X) and a resistive impedance (R). This technique has several advantages including improved dynamic response and harmonic compensation. With this version of droop control, the above equations are satisfied when the X/R ratio of the virtual impedance is matched to the X/R ratio of the grid impedance. Existing techniques for implementing this matching involve injecting a current into the grid and analyzing the response. These techniques are computationally intensive, slow, and pose a risk causing instabilities in weak grids.

Therefore, there is a need in the art for an efficient technique for matching the ratio of the reactive impedance to the real impedance for a virtual impedance droop control technique.

SUMMARY OF THE INVENTION

Embodiments of the present invention generally relate to a method and apparatus for impedance matching in virtual impedance droop-controlled power conditioning units substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention include a method and apparatus for matching the reactive impedance to real impedance ratio of a power conditioning unit operating in a virtual impedance droop control mode. Embodiments of the invention described herein provide an elegant technique for optimally setting the reactive impedance to real impedance ratio (X/R ratio) of a power conditioning unit (such as a DC-AC inverter) thereby allowing the power conditioning unit to maintain better voltage and frequency quality at lower operating currents, which translates into a lower cost of operation.

Embodiments of the invention do not require grid impedance measurement, thereby simplifying the complexity of the computations required. Additionally, the method matches the phase of virtual source voltage to measured output voltage and thereby matches the actual emulated impedance with the grid rather than the desired emulated impedance, thus cancelling out the error in the impedance emulation.

Embodiments of the invention also implement the matching by adding a disturbance to the virtual source voltage rather than injecting a current, which inherently limits the amplitude of the resulting disturbance to the grid.

Figure 1:
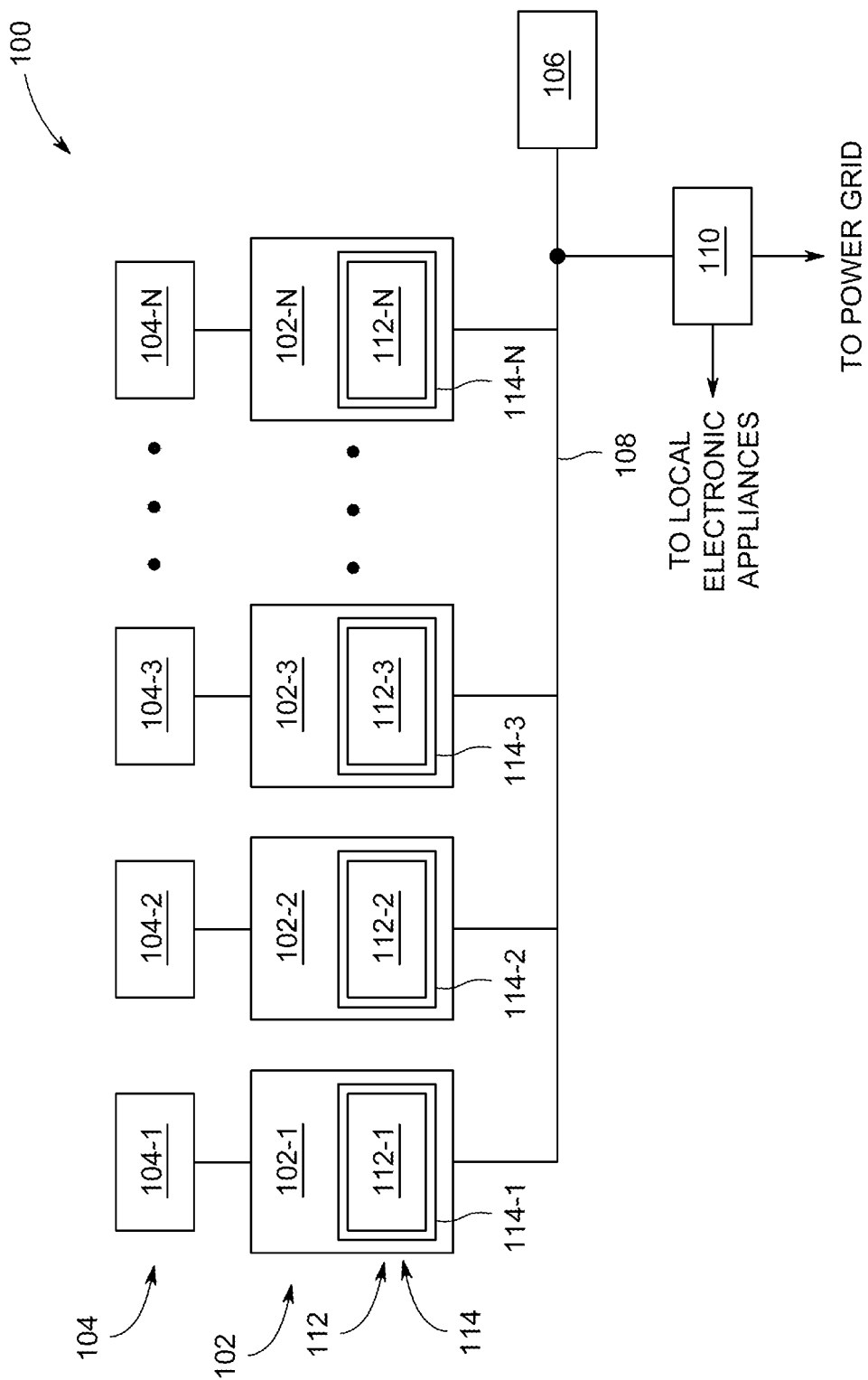
FIG. 1 is a block diagram of a system for power conversion using one or more embodiments of the present invention.

FIG. 1 is a block diagram of a system 100 for power conversion using one or more embodiments of the present invention. This diagram only portrays one variation of the myriad of possible system configurations and devices that may utilize the present invention.

The system 100 comprises a plurality of power conditioning units (PCUs) 102-1, 102-2, 102-3 ... 102-N, collectively referred to as PCUs 102; a plurality of DC power sources 104-1, 104-2, 104-3 ... 104-N, collectively referred to as DC power sources 104; a system controller 106; a bus 108; and a load center 110. The DC power sources 104 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each PCU 102-1, 102-2, 102-3 ... 102-N is coupled to a DC power source 104-1, 104-2, 104-3 ... 104-N, respectively, in a one-to-one correspondence, although in some other embodiments multiple DC power sources 104 may be coupled to one or more of the PCUs 102. The PCUs 102 are coupled to the system controller 106 via the bus 108. The system controller 106 generally comprises a CPU coupled to support circuits and a memory that comprises a system control module for controlling some operational aspects of the system 100 and/or monitoring the system 100 (e.g., issuing certain command and control instructions to one or more of the PCUs 102, collecting data related to the performance of the PCUs 102, and the like). The controller 106 is capable of communicating with the PCUs 102 by wireless and/or wired communication (e.g., power line communication) for providing certain operative control and/or monitoring of the PCUs 102. In one or more embodiments, the controller 106 may be a gateway that obtains data pertaining to the PCUs 102 and transmits the data to a remote device, such as a master controller, via a communications network such as the Internet.

The PCUs 102 are further coupled to the load center 110 via the bus 108. In some embodiments the bus 108 is an AC bus and the PCUs 102 are DC-AC inverters that convert DC-to-AC and/or AC-to-DC. In some of such embodiments, the inverters are single-phase inverters; in others of such embodiments, the inverters are two- or three-phase inverters.

In one or more embodiments, the system 100 may additionally comprise one or more devices for storing and delivering energy, such as storage batteries, coupled to one or more PCUs 102 in a one-to-one correspondence (not shown), where such PCUs 102 are also coupled to the bus 108. In such embodiments, the PCUs 102 coupled to the energy storage devices are bidirectional converters that can convert power from the bus 108 for storage in the corresponding energy storage device and can convert energy stored in the corresponding storage device to an output power that is coupled to the bus 108. For example, the PCUs 102 may be DC-AC inverters that can convert received DC power to AC output as well as convert received AC power to DC output. Each PCU 102 and corresponding energy storage device may be referred to as an "AC battery".

The PCUs 102 convert the DC power from the DC power sources 104 to AC output power and couple the generated output power to the load center 110 via the bus 108. The power is then distributed for use, for example to one or more appliances, and/or the generated energy may be stored for later use, for example using batteries, heated water, hydro pumping, $H_2O$-to-hydrogen conversion, or the like. Generally the system 100 is coupled to a larger power grid, such as a commercial power grid or larger microgrid, although in some embodiments the system 100 is completely separate from another power grid and operates as an independent microgrid.

In one or more embodiments, the system 100 may additionally comprise an island interconnect device (IID)—which may alternatively be referred to as a microgrid interconnect device (MID)—(not shown) for determining when to disconnect from/connect to the larger grid and for performing the disconnection/connection. For example, the IID may detect a grid fluctuation, disturbance or outage and, as a result, disconnect the system 100 from the larger grid. Once disconnected from the larger grid, the system 100 can continue to generate power as an intentional island, without imposing safety risks on any line workers that may be working on the larger grid, using the droop control techniques described herein. The IID comprises a disconnect component (e.g., a disconnect relay) for physically disconnecting/connecting the system 100 from/to the larger grid. In some embodiments, the IID may additionally comprise an autoformer for coupling the balanced power system 100 to a split-phase load that may have a misbalance in it with some neutral current. Although in some embodiments the IID may be part of the system 100, the techniques described herein do not require an IID. For example, the system 100 may be operating as a small part in a much larger microgrid where it is not designed to operate alone, in which case an IID would not be needed.

In certain embodiments, the system controller 106 comprises the IID or a portion of the IID. For example, the system controller 106 may comprise an islanding module for monitoring the grid, detecting grid failures and disturbances, determining when to disconnect from/connect to the larger grid, and driving a disconnect component accordingly, where the disconnect component may be part of the system controller 106 or, alternatively, separate from the system controller 106. In other embodiments, the IID is separate from the system controller 106 and comprises a disconnect component as well as a CPU and an islanding module for monitoring the grid, detecting grid failures and disturbances, determining when to disconnect from/connect to the larger grid, and driving the disconnect component accordingly. In some embodiments, the IID may coordinate with the system controller 106, e.g., using power line communications. Thus, the disconnection/connection of the system 100 to the larger grid is a controlled process driven by the IID.

When the system 100 is coupled to the larger grid and the DC sources 104 supply DC power to the PCUs 102 (e.g., during daylight hours in embodiment where the DC sources 104 are PV modules), the PCUs 102 operate in a power mode and generate grid compliant AC power (i.e., real and/or reactive power) using the larger grid AC voltage as a reference.

When the system 100 is disconnected from the larger grid (i.e., using the IID or the system controller 106) and is operating as a microgrid, a virtual impedance droop control technique is employed for parallel operation of the PCUs 102. The virtual impedance droop control technique is a time-domain implementation of droop control by which the PCU 102 is controlled to appear as a virtual AC voltage source in series with a virtual impedance. In some embodiments, the virtual impedance droop control technique is used when connected to a larger grid when the devices are to participate in grid control; such a technique is especially applicable in these embodiments, as the grid impedance that each resource sees will change, requiring a method of adapting if optimal control is to be maintained. One example of such a virtual impedance droop control technique may be found in commonly assigned U.S. patent application Ser. No. 15/048,651, entitled "Method and Apparatus for Time-Domain Droop Control with Integrated Phasor Current Control" and filed Feb. 19, 2016, which is herein incorporated in its entirety by reference.

In accordance with one or more embodiments of the present invention, each of the PCUs 102 implements a virtual impedance droop control technique where the virtual impedance emulated on the PCU 102 is such that the virtual impedance ratio of the PCU's inductive impedance (X) to resistive impedance (R) (i.e., the PCU's virtual impedance ratio X/R) matches the impedance ratio (X/R) of the grid at the device coupling point. Each of the PCUs 102 comprises a controller 114 having an impedance matching module 112 for implementing the virtual impedance droop control impedance matching technique described herein to match the PCU's virtual impedance ratio X/R to the grid's impedance ratio X/R for optimal droop control performance. The virtual impedance droop control impedance matching technique described herein is implemented in each PCU 102 such that the PCUs 102 converge optimally to the correct virtual impedance ratio.

In order to determine whether a PCU's virtual impedance ratio X/R is matched to the grid's impedance ratio X/R, the PCU 102 applies a tone voltage (i.e., a single-frequency sinusoidal voltage) to the virtual voltage. In some embodiments, multiple tone voltages may be used. In those embodiments where multiple tones are used, the resulting phase data obtained as described herein may be averaged and/or otherwise intelligently filtered; for example, the fifth and seventh harmonics of the grid may be used at equal amplitudes and the phase offsets are then averaged.

Generally, the tone is selected such that it is easy to measure, typically free of noise or other disturbances from regular loads which may distort the measurement, within a frequency band where the impedance seen will be similar to the impedance seen at the fundamental frequency, and doesn't cause any issues with connected loads such as motors. In one or more embodiments, the tone is between 200 Hz and 1 kHz.

The phase of the tone on the grid is then measured. The phase of the tone may be measured by any of a variety of techniques, such as using a Fourier Transform, a Kalman estimator (e.g., as part of a phase lock loop (PLL)), or the like. When the virtual impedance ratio X/R and the grid impedance ratio X/R are matched, no phase shift in the tone is measured (i.e., the phase shift is zero); when a phase shift in the tone is measured, the ratios are not matched. In some embodiments, the ratios are considered matched when the phase shift is less than a threshold; e.g., If you the impedance is emulating digitally (i.e., a "virtual" impedance), then the ratio can be changed.

Upon determining that the ratios are not matched, the PCU's virtual impedance is then adjusted to drive toward the grid impedance ratio. Based on whether the phase of the tone on the grid is measured to be lagging or leading the phase of the applied tone, the PCU's virtual impedance ratio can be increased or decreased accordingly to iteratively drive the ratio toward the grid impedance ratio. If the measured tone lags the applied tone, the virtual X/R ratio is too high and needs to be decreased; conversely, if the measured tone leads the applied tone, the virtual X/R ratio is too low and needs to be increased.

Generally, it is desirable to keep amplitude of the total impedance, Z, constant, where the total impedance Z is calculated as $Z^2=X^2+R^2$. Keeping Z constant and letting XR=the desired ratio X/R and RX=1/XR, R and X can be determined as $R=Z/sqrt(XR^2+1)$ and $X=Z/sqrt(RX^2+1)$. In one or more embodiments, Z is selected to throttle the overall response of the PCU 102, with smaller Z's yielding larger response. This can be used to coordinate the response of different PCUs 102; for example, PCUs 102 with more power capability will have smaller Z's so they contribute more to a disturbance.

The technique described herein for matching the virtual impedance ratio to the grid impedance ratio is performed in real-time, thereby ensuring that the virtual impedance ratio continually converges to the grid impedance ratio. Further, such a technique is immune to certain errors in the virtual impedance emulation; for example, accuracy between a targeted virtual impedance ratio and an actual emulated virtual impedance ratio is immaterial since the technique does not rely on the actual value of the grid impedance ratio. Furthermore, by injecting a tone on the virtual source voltage (e.g., a maximum 1-volt tone), the technique described herein limits distortion on the grid such that the grid can remain with total harmonic distortion (THD) limits.

The technique described herein may be repeated continuously, on a pre-determined schedule, periodically (e.g., once a second, once a day, and the like), and/or in response to certain events such as islanding, re-connection to a larger grid, or if a disturbance in the grid is detected.

Figure 2:
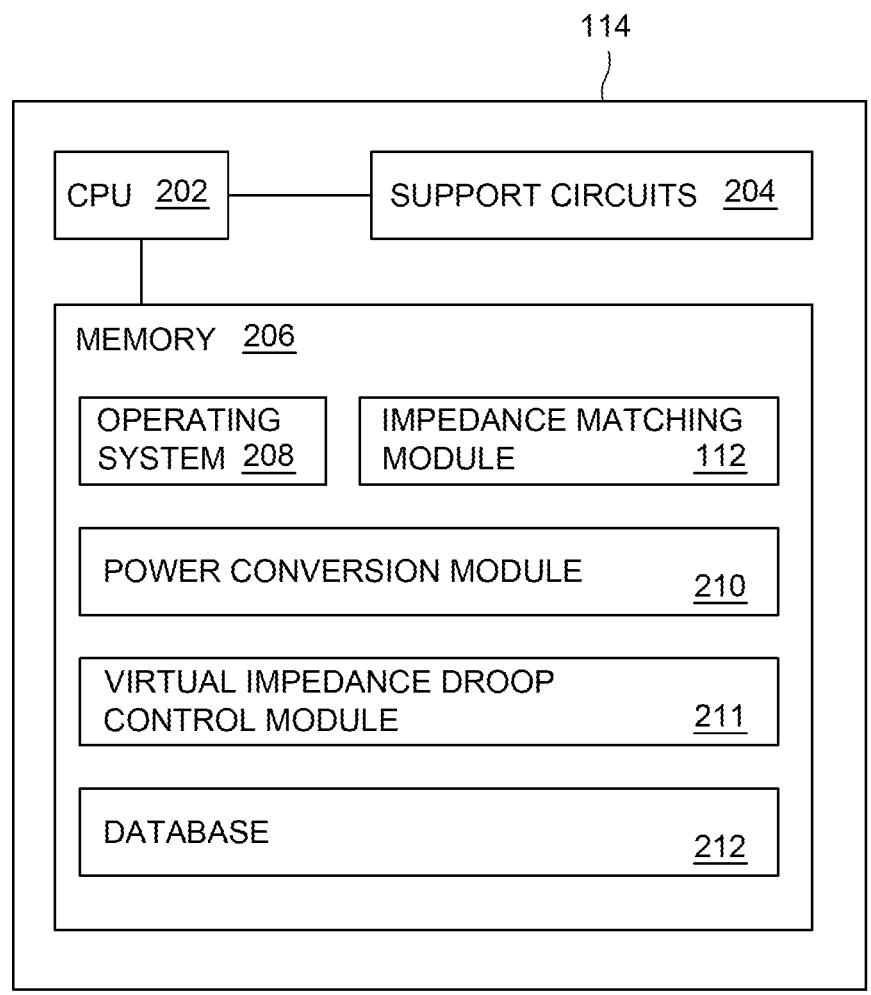
FIG. 2 is a block diagram of a controller in accordance with one or more embodiments of the present invention.

FIG. 2 is a block diagram of a controller 114 in accordance with one or more embodiments of the present invention. The controller 114 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The controller 114 may be implemented using a general purpose computer that, when executing particular software, becomes a specific purpose computer for performing various embodiments of the present invention. In one or more embodiments, the CPU 202 may be a microcontroller comprising internal memory for storing controller firmware that, when executed, provides the controller functionality described herein.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 114 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software, such as a power conversion module 210 for controlling power conversion by the PCU 102, a virtual impedance droop control module 211 for operating the PCU 102 in a virtual impedance droop control mode when the system 100 is operating as a microgrid or when connected to a larger grid when the devices are to participate in grid control, and an impedance matching module 112 for performing the virtual impedance droop control impedance matching techniques described herein.

The memory 206 additionally stores a database 212 for storing data related to the operation of the PCU 102 and/or the present invention.

Figure 3:
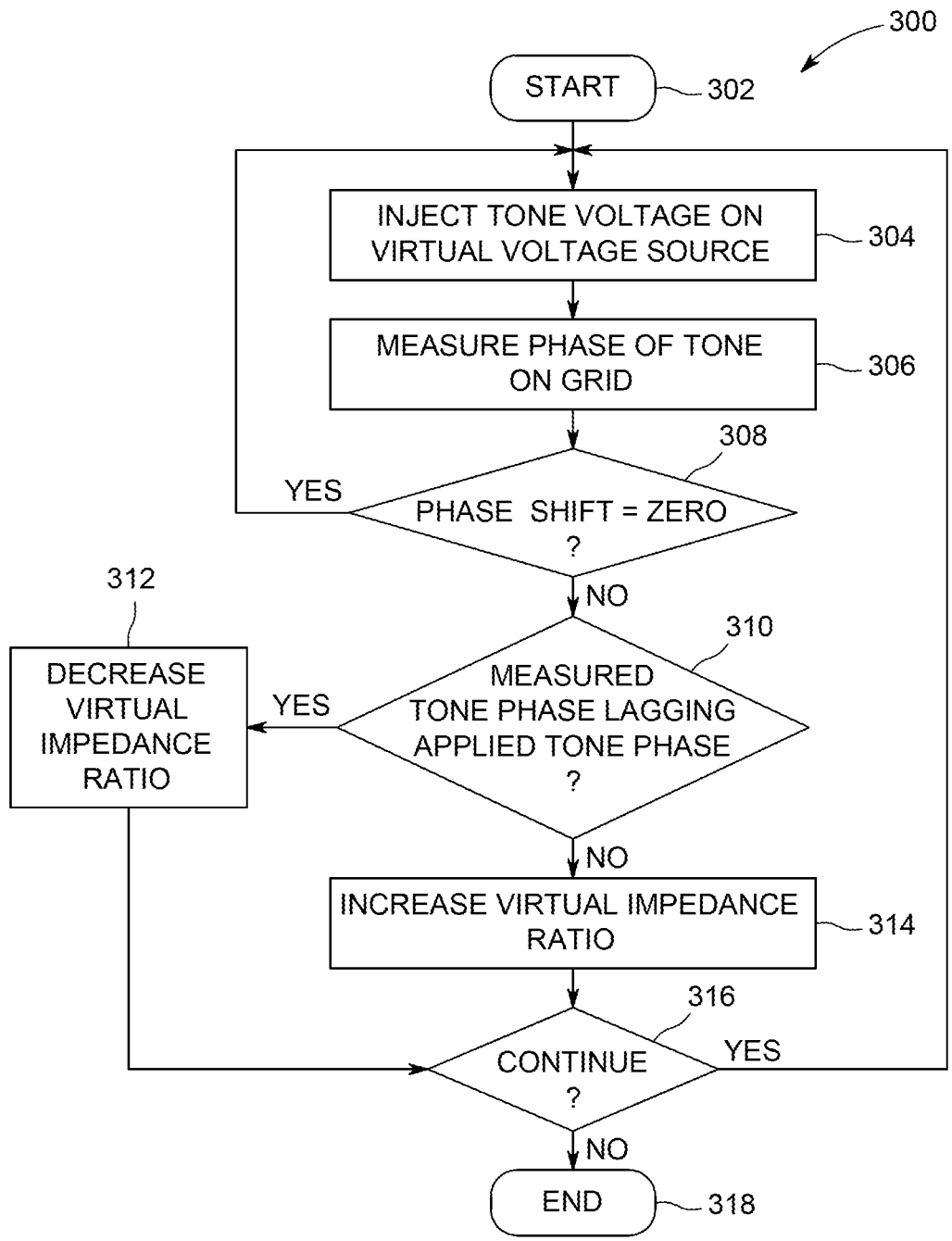
FIG. 3 is a flow diagram of a method for impedance matching in a virtual impedance droop controlled power conditioning unit in accordance with one or more embodiments of the present invention.

FIG. 3 is a block diagram of a method 300 for impedance matching in a virtual impedance droop controlled power conditioning unit (PCU) in accordance with one or more embodiments of the present invention.

In certain embodiments, such as the embodiment described below, the PCU is part of a power conversion system (e.g., the system 100) comprising a plurality of PCUs (e.g., the PCUs 102) coupled to a plurality of DC sources and/or DC energy storage/delivery devices; in some of such embodiments, the DC sources are photovoltaic (PV) modules. Each PCU operates in a virtual impedance droop control mode for parallel operation of the PCUs when the power conversion system is operating as a microgrid or when connected to a larger grid when the devices are to participate in grid control. In the virtual impedance droop control mode, the PCU is operated to appear as a virtual AC voltage source in series with a virtual impedance having a resistive impedance (R) and an inductive impedance (X). In some embodiments, the virtual impedance ratio X/R of the PCU is initially set to match the ratio between frequency and voltage load governing; in other embodiments, the virtual impedance ratio X/R is set to equal 1, which provides good damping characteristics and results in voltage and frequency both changing as a function of real and reactive power.

In one or more embodiments, the method 300 is an implementation of the impedance matching module 112. In some embodiments, a computer readable medium comprises a program that, when executed by a processor, performs the method 300 that is described in detail below.

The method 300 starts at step 302 and proceeds to step 304. At step 304, a tone voltage (i.e., a single-frequency sinusoidal voltage) is injected on the virtual voltage source. At step 306, the phase of the tone on the grid is measured.

The method 300 proceeds to step 308 where the phase of the tone on the grid is compared to the phase of the applied tone to determine whether the phase of the tone on the grid has a phase shift equal to zero. If the result of the determination at step 308 is yes, that the phase shift is equal to zero, the PCU's virtual impedance ratio X/R is matched to the grid's impedance ratio X/R and the method 300 returns to steps 304. If the result of the determination is no, that the phase shift is not equal to zero, the method 300 proceeds to step 310. In some alternative embodiments, at step 308 a determination is made whether the phase shift is equal to zero or proximate to zero (i.e., whether the value of the phase shift is less than a threshold).

At step 310, a determination is made whether the measured tone phase is lagging the applied tone phase. If the result of the determination at step 310 is yes, that the measured tone phase is lagging the applied tone phase, the method 300 proceeds to step 312 where the virtual impedance ratio is decreased. The method 300 then proceeds from step 312 to step 316.

If the result of the determination at step 310 is no, that the measured tone phase is not lagging the applied tone phase (i.e., that the measured tone phase is leading the applied tone phase), the method 300 proceeds to step 314 where the virtual impedance ratio is increased. The method 300 then proceeds to step 316.

In some embodiments, the virtual impedance ratio may be changed (i.e., increased or decreased) by a fixed amount, while in other embodiments the virtual impedance ratio may be changed by an amount proportional to the phase difference. In certain embodiments, the virtual impedance ratio may be changed in proportion to the phase difference up to a limit so that the X/R ratio can only change by a limited amount each time it is adjusted.

At step 316, a determination is made whether to continue operation. If the result of the determination is yes, the method 300 returns to step 304; if the result of the determination is no, the method 300 proceeds to step 318 where it ends.

By iteratively adjusting each PCU's virtual impedance ratio in real-time to drive toward the grid impedance ratio, the PCU virtual impedance ratios continually converge to the grid impedance ratio even if the grid impedance ratio changes.

While the foregoing is directed to embodiments of the present invention, other and further embodiments of the invention may be devised without departing from the basic scope thereof, and the scope thereof is determined by the claims that follow.

The invention claimed is:

1. A method for setting an impedance of a power conditioning unit (PCU), comprising:
   applying a disturbance to a virtual AC voltage produced by a power conditioning unit (PCU) that is coupled to a power grid, where the disturbance has a first phase;
   measuring a second phase of the applied disturbance on the power grid;
   comparing the second phase of the applied disturbance to the first phase of the disturbance; and
   adjusting, when the second phase differs from the first phase by more than a threshold amount, an impedance of the PCU.

2. The method of claim 1, wherein the disturbance is a tone voltage.

3. The method of claim 2, wherein the frequency of the tone voltage is within the range of 200 Hz-1 kHz.

4. The method of claim 1, wherein adjusting the impedance comprises decreasing an impedance ratio when the second phase lags the first phase.

5. The method of claim 1, wherein adjusting the impedance comprises increasing an impedance ratio when the second phase leads the first phase.

6. The method of claim 1, wherein the PCU is a DC-AC inverter.

7. The method of claim 5, wherein the DC-AC inverter is coupled to a photovoltaic (PV) module for receiving a DC input.

8. An apparatus for setting an impedance of a power conditioning unit (PCU), comprising:
   a controller, comprising at least one central processing unit, for (i) applying a disturbance to a virtual AC voltage produced by a power conditioning unit (PCU) that is coupled to a power grid, where the disturbance has a first phase; (ii) measuring a second phase of the applied disturbance on the power grid; (iii) comparing the second phase of the applied disturbance to the first phase of the disturbance; and (iv) adjusting, when the second phase differs from the first phase by more than a threshold amount, an impedance of the PCU.

9. The apparatus of claim 8, wherein the disturbance is a tone voltage.

10. The apparatus of claim 9, wherein the frequency of the tone voltage is within the range of 200 Hz-1 kHz.

11. The apparatus of claim 8, wherein adjusting the impedance comprises decreasing an impedance ratio when the second phase lags the first phase.

12. The apparatus of claim 8, wherein adjusting the impedance comprises increasing an impedance ratio when the second phase leads the first phase.

13. The apparatus of claim 8, wherein the PCU is a DC-AC inverter.

14. The apparatus of claim 12, wherein the DC-AC inverter is coupled to a photovoltaic (PV) module for receiving a DC input.

15. A system for setting an impedance of a power conditioning unit (PCU), comprising:
 a plurality of DC power sources; and
 a plurality of PCUs coupled to the plurality of DC power sources in a one-to-one correspondence, wherein each PCU of the plurality of PCUs comprises a controller, the controller comprising at least one central processing unit, for (i) applying a disturbance to a virtual AC voltage produced by a power conditioning unit (PCU) that is coupled to a power grid, where the disturbance has a first phase; (ii) measuring a second phase of the applied disturbance on the power grid; (iii) comparing the second phase of the applied disturbance to the first phase of the disturbance; and (iv) adjusting, when the second phase differs from the first phase by more than a threshold amount, an impedance of the PCU.

16. The system of claim 15, wherein adjusting the impedance comprises decreasing an impedance ratio when the second phase lags the first phase.

17. The system of claim 15, wherein adjusting the impedance comprises increasing an impedance ratio when the second phase leads the first phase.

18. The system of claim 15, wherein each PCU of the plurality of PCUs is a DC-AC inverter.

19. The system of claim 15, wherein each DC power source of the plurality of DC power sources is a photovoltaic (PV) module.

20. The system of claim 15, wherein the disturbance is a tone voltage having a frequency within the range of 200 Hz-1 kHz.

* * * * *